United States Patent [19]

Allenson

[11] Patent Number: 4,734,274

[45] Date of Patent: Mar. 29, 1988

[54] STABILIZATION OF AQUEOUS ALKALI METAL ALUMINATE SOLUTIONS

[75] Inventor: Stephen J. Allenson, Richmond, Tex.

[73] Assignee: Nalco Chemical Company, Naperville, Ill.

[21] Appl. No.: 927,563

[22] Filed: Nov. 6, 1986

[51] Int. Cl.$^4$ ............................................. C01F 7/04
[52] U.S. Cl. .................................... 423/265; 423/600
[58] Field of Search ............................... 423/265, 600

[56] References Cited

U.S. PATENT DOCUMENTS

| | | | |
|---|---|---|---|
| 3,617,542 | 11/1971 | Boezier | 210/631 |
| 3,656,889 | 4/1972 | Olewinski | 423/265 |
| 4,007,252 | 2/1977 | Burroughs | 423/600 |
| 4,072,622 | 2/1978 | Kühling et al. | 423/265 |
| 4,098,972 | 7/1978 | Ogawa et al. | 526/62 |
| 4,252,735 | 2/1981 | Layer et al. | 423/265 |
| 4,413,680 | 11/1983 | Sandiford | 166/270 |

FOREIGN PATENT DOCUMENTS

| | | | |
|---|---|---|---|
| 964808 | 3/1975 | Canada | 423/265 |
| 1119773 | 3/1982 | Canada | 423/265 |
| 2058274 | 6/1971 | Fed. Rep. of Germany | 423/265 |
| 2445512 | 4/1975 | Fed. Rep. of Germany | 423/265 |
| 82122 | 5/1971 | German Democratic Rep. | 423/265 |
| 49-3751 | 1/1974 | Japan | 423/265 |
| 49-20764 | 5/1974 | Japan | 423/265 |
| 52-35229 | 3/1977 | Japan | 423/265 |
| 4101908 | 8/1979 | Japan | 423/265 |
| 4151524 | 11/1979 | Japan | 423/265 |
| 7119974 | 7/1982 | Japan | 423/265 |
| 135853 | 8/1982 | Japan | 423/265 |
| 205597 | 12/1982 | Japan | 423/265 |
| 8186699 | 10/1983 | Japan | 423/265 |
| 9100272 | 6/1984 | Japan | 423/265 |
| 9102910 | 6/1984 | Japan | 423/265 |
| 413206 | 1/1976 | Spain | 423/265 |
| 1043216 | 9/1983 | U.S.S.R. | 423/265 |
| 1049515 | 10/1983 | U.S.S.R. | 423/265 |

OTHER PUBLICATIONS

"Improved Method for Manufacturing Paper" Res Discl., 201, 17, 1981.
Chem Abstract 65-5224b.
Chem Abstract 58-6575c.
Yamada, "Behavior of Organics in Sodium Aluminate Solution in the Bayer Process, Keikinzoku v31 n6 Jun. 1981 pp. 371–377.
Roth et al. "Studies of Stabilization and Transport Mechisms in Beta and Beta Alumina by Neutron Diffraction", *Phys of Solids and Liq* N.Y. N.Y. 1976 pp. 223–241.
Chem Abstract 61-1537c.
Chem Abstract 56-9711h.
Chem Abstract 54-9439c.
Chem Abstract 52-16014g.
Gambhir, "Waste Treatment in an Automotive Component Complex", Proc. Ind Waste Conf, 37,203–6.
Gambhir, "Expanded Waste Water Treatment at a Metal Working Plant, Ind, Wastes 28(3) 14–16, 1982.

*Primary Examiner*—Patrick P. Garvin
*Assistant Examiner*—Paige C. Harvey
*Attorney, Agent, or Firm*—John G. Premo; Joan I. Norek; Anthony L. Cupoli

[57] ABSTRACT

A method of stabilizing an aqueous solution of alkali metal aluminate comprises admixing an aqueous solution of alkali metal aluminate having a pH of at least 10 with a sufficient amount of carboxylate-containing vinyl polymer to form a solution containing fron 0.1 to 2.0 weight percent of an anionic vinyl polymer based on alkali metal aluminate solids, and a stabilized aqueous alkali metal aluminate solution.

14 Claims, No Drawings

4,734,274

STABILIZATION OF AQUEOUS ALKALI METAL ALUMINATE SOLUTIONS

TECHNICAL FIELD OF THE INVENTION

The present invention is in the technical field of industrial chemicals, and more particularly aqueous alkali metal aluminate solutions and stabilizers therefor.

BACKGROUND OF THE INVENTION

Alkali metal aluminates, such as sodium aluminate, are used industrially for hundreds of types of applications, for instance as coagulating agents in water clarification processes and as a papermaking additives. In many of such applications alkali metal aluminates are used as aqueous solutions and it is often preferable to prepare such solutions a significant time prior to use. Many industrial end-users in fact purchase such chemicals as aqueous solutions.

One disadvantage of such aqueous alkali metal aluminate solutions is that they may have a certain degree of instability. These products may crystalize and separate out of solution a number of weeks after preparation, which decreases the activity of the product and creates handling problems.

Stabilizing agents for aqueous alkali metal aluminate solutions known heretofore include a certain combination of tartaric and gluconic acids disclosed in U.S. Pat. No. 3,656,889. U.S. Pat. No. 2,345,134 discloses using a stabilizing agent which may consist of any one or combination of a number of substances such as Rochelle salts, tartaric acid and its salts, saccharates, gluconic acid and its salts, gallic acid and its salts, and other similar substances.

In the industrial chemical field not only is an improved stabilizer for aqueous alkali metal aluminate solutions desirable but also alternative stabilizers are desired. Given the vast number of applications in which alkali metal aluminates are presently used or may be used in the future, the potential for incompatibility of any given stabilizer with an in-use environment can never be reduced to zero.

DISCLOSURE OF THE INVENTION

The present invention provides a method of stabilizing an aqueous solution of alkali metal aluminate comprising admixing an aqueous solution of alkali metal aluminate having a pH of at least 10 with a sufficient amount of carboxylate-containing vinyl polymer to form a solution containing from 0.1 to 2.0 weight percent of an anionic vinyl polymer based on alkali aluminate solids. The anionic vinyl polymer preferably is comprised of at least 90 weight percent of units having the Formula I as follows:

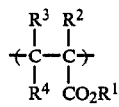

wherein $R^1$ is hydrogen, alkali metal cation, ammonia cation, or alkyl of 1 to 16 carbon atoms, and $R^2$, $R^3$, and $R^4$ are each independently hydrogen, alkyl of 1 to 16 carbon atoms, or a carboxylic acid moiety or water soluble salt thereof.

In preferred embodiments the alkali metal aluminate is sodium aluminate, and the carboxylate-containing vinyl polymer is admixed as a water-external polymer latex prepared by emulsion polymerization.

The present invention also provides a stabilized alkali metal aluminate composition comprised of an alkali metal aluminate, an anionic vinyl polymer, and water wherein the composition is an ungelled solution having a pH of at least 10 and the anionic vinyl polymer is present in the amount of from 0.1 to 2.0 weight percent based on alkali metal solids.

PREFERRED EMBODIMENTS OF THE INVENTION

Alkali metal aluminates, such as sodium aluminate, may be stabilized with anionic vinyl polymer, particularly polymer comprised of at least 90 weight percent of units having the Formula I as defined above. Such anionic polymer may be derived from carboxylate-containing polymer having no or little carboxylic acid or water soluble salt functionality which would readily become anionic or more anionic in the aqueous environment at the elevated pH by hydrolysis of some carboxylate ester functionality. Such polymer may be made by the polymerization of ethylenically unsaturated monomers including acids such as acrylic acid, methacrylic acid, crotonic acid, itaconic acid, ethyl acrylic acid, maleic acid, and the water soluble alkali metal and ammonia salts of such acids, and anhydrides such as acrylic anhydride, maleic anhydride, crotonic anhydride, and carboxylic ester containing monomers such as methyl acrylate, ethyl acrylate, methyl methacylate, ethyl methacrylate, butyl acrylate, ethylhexyl acrylate, and the like.

In preferred embodiment the polymer is admixed as a water-external polymer latex, preferably formed by emulsion polymerization. Emulsion polymerization processes suitable for making such latices are well known in the art, and may provide polymer latices in suitable form for addition to the aqueous alkali metal aluminate solution without any additional process steps. The admixture may be conducted slowly under agitation to assure rapid intermixing of the polymer and alkali metal aluminate solution, and hence such purpose may be facilitated by the use of a polymer latex having 50 weight percent or less polymer solids. Such latices may be prepared at higher polymer solids and admixed at such concentration if, given the admixing conditions, the polymer concentration does not interfere with reasonably rapid intermixing of the polymer and the alkali metal aluminate solution, or a latex of any given concentration may be diluted with water to provide convenient polymer concentration for admixture. Such dilution may be done prior to admixing or during admixture.

The carboxylate-containing vinyl polymer may be in other than latex form when admixed with the alkali metal aluminate solution provided that such admixture is conducted in such a manner so as to avoid gelling of the combination.

As mentioned above, the anionic vinyl polymer may be derived from a carboxylate-containing vinyl polymer that has no or little free carboxylic acid or water soluble salts thereof moieties. Such a carboxylate-containing vinyl polymer would differ from the anionic polymer as hydrolyzed in the elevated pH environment after admixing with the alkali metal aluminate solution having a pH of at least 10 by the number of units of the Formula I in which $R^1$ is alkyl.

The carboxylate-containing vinyl polymer may be a homopolymer, even a homopolymer of carboxylic esters such as ethyl acrylate or methyl methacrylate. The anionic polymer may be a homopolymer of ethylenically-unsaturated carboxylic acid containing monomers such as a homopolymer of acrylic acid or methacrylic acid. Either may be produced by the polymerization of more than one type of monomer, such as copolymers, terpolymers, and the like, and may include methylacrylate/acrylic acid copolymers, ethyl acrylate/methacrylic acid copolymers, methylacrylate/maleic anhydride copolymers, and the like, or ethylacrylate/butylacrylate/acrylic acid polymers, ethylhexylacrylate/methylmethacrylate/methacrylic acid polymers, ethylmethacrylate/ethyl acrylic acid polymers, and the like. A preferred anionic vinyl polymer is an ethyl acrylate/methacrylic acid copolymer.

When the carboxylate-containing vinyl polymer is admixed with the alkali metal aluminate solution as a water-external polymer latex, the carboxylate-containing polymer should not be overly water soluble. The polymer should then contain no more than 70 weight percent of units of Formula I containing a free carboxylic acid or water soluble salt thereof moiety and less than 10 total carbons, and no more than 35 weight percent of units of Formula I containing more than one free carboxylic acid or water soluble salt thereof functionalities.

In preferred embodiment the anionic vinyl polymer is comprised of at least 95 weight percent of units having the Formula I above wherein $R^1$ is hydrogen, alkali metal cation, ammonia cation, or alkyl of 1 to 4 carbon atoms, and $R^2$, $R^3$, and $R^4$ are independently hydrogen or alkyl, wherein $R^2$, $R^3$, and $R^4$ together comprise no more than 2 carbon atoms. Such anionic polymer may be a copolymer of acrylic esters such as butyl acrylate, isobutyl acrylate, ethyl acrylate, and methyl acrylate, and the like, with acrylic acid or methacrylic acid, and the like, or may contain more than two species of such monomers.

As indicated above, the term "carboxylate-containing" refers to the inclusion of pendant, carboxylic acids groups, or water soluble salts of carboxylic acids, i.e., alkali metal and ammonia salts, and also carboxylic esters that will hydrolyze to such acids and salts in elevated pH environment.

The anionic vinyl polymer described above preferably should have a molecular weight of at least 500,000 and preferably of at least 1,000,000 (each as average molecular weight).

The anionic vinyl polymer may contain up to 10 weight percent of unit(s) not within Formula I above, such as those derived from other ethylenically unsaturated monomers such as styrene, methyl vinyl ketone, propylene, acrylonitrile, acrylamide, vinyl acetate and the like or other units, provided that the type and amount thereof does not so increase the water solubility of the polymer to unstabilize the water-external polymer latex if used nor interfere with the alkali metal aluminate's activity in the desired application.

In preferred embodiment the admixture is conducted at elevated temperature, preferably at a temperature of from about 105° F. to about 250° F., to reduce the amount of time over which the admixture takes place. The admixing should be done slowly over a period of time and lower temperature environments will require slower admixing.

In an embodiment a carboxylate-containing latex is admixed with the metal salt solution by adding the emulsion or latex to the solution.

EXAMPLE 1

An ethylacrylate/methacrylic acid copolymer latex was prepared by polymerization of a mixture containing 65 mole percent ethylacrylate and 35 mole percent methacrylic acid using standard free radical, emulsion polymerization techniques, continuing the polymerization until substantially all monomer was polymerized, to provide a water-external latex containing 30 weight percent polymer actives. One part by weight of this latex was admixed with 99 parts by weight of an aqueous sodium aluminate solution to stabilize the sodium aluminate solution as follows. The ethylacrylate/methacrylic acid copolymer produced had a molecular weight within the range of 3,000,000 to 5,000,000 (determined by the reduced specific viscosity method). The latex was slowly added to the aqueous solution over a 45 minute period. The sodium aluminate solution was under constant agitation and held at a temperature of 230° F. (110° C.) throughout the latex addition period. Upon completion of the latex addition, the resultant blend was cooled to ambient room temperature. The blend was a clear, turbidity-free aqueous solution. The sodium aluminate batch contained from 31 to 33 weight percent sodium aluminate as $NaAlO_2$ and had a pH greater than 12. Upon admixture of the sodium aluminate and latex, the resultant solution contained 0.3 weight percent ethylacrylate/methacrylic acid copolymer actives based on total solution, and about 1 weight percent ethylacrylate/methacrylic acid copolymer based on sodium aluminate solids. Three 100 ml. samples of this treated sodium aluminate solution were stored for 144 days in containers vented to the atmosphere at different constant temperatures, each together with a like sample of untreated sodium aluminate solution for comparison. These samples were examined at intervals and the volume percentage of crystals formed therein determined. The storage temperatures used were 75° F., 120° F., and 130° F. The volume percentages of crystal formation in the samples at the examination intervals are set forth below in Table I.

TABLE I

| | Volume Percent Crystal | | | | | |
|---|---|---|---|---|---|---|
| | 75° F. Storage Temp. | | 120° F. Storage Temp. | | 130° F. Storage Temp. | |
| Storage Time (days) | Treated Sample | Untreated Sample | Treated Sample | Untreated Sample | Treated Sample | Untreated Sample |
| 32 | 0 | 0 | 0 | 0 | 0 | 0 |
| 35 | 0 | 1 | 0 | 10 | 0 | 10 |
| 40 | 0 | 2 | 0 | 10 | 0 | 10 |
| 55 | 0 | 3 | 0 | 10 | 0 | 10 |
| 87 | 0 | 5 | 2 | 10 | 2 | 10 |
| 110 | 0 | 7 | 2 | 10 | 2 | 10 |
| 144 | 0 | 10 | 2 | 10 | 2 | 10 |

EXAMPLE 2

The Test described in Example 1 was repeated using like samples of the same treated and untreated sodium aluminate solutions except the storage containers were sealed instead of vented to the atmosphere and the storage time for the samples stored at 75° F. was extended to 251 days. The volume percentages of crystal formation in the samples at the examination intervals are set forth below in Table II.

TABLE II

| | Volume Percent Crystal | | | | | |
|---|---|---|---|---|---|---|
| | 75° F. Storage Temp. | | 120° F. Storage Temp. | | 130° F. Storage Temp. | |
| Storage Time (days) | Treated Sample | Untreated Sample | Treated Sample | Untreated Sample | Treated Sample | Untreated Sample |
| 32 | 0 | 0 | 0 | 0 | 0 | 0 |
| 35 | 0 | 0 | 0 | 0 | 0 | 0 |
| 40 | 0 | 0 | 0 | 0 | 0 | 0 |
| 55 | 0 | 1 | 0 | 4 | 0 | 4 |
| 87 | 0 | 2 | 0 | 8 | 0 | 8 |
| 110 | 0 | 5 | 0 | 10 | 1 | 10 |
| 144 | 0 | 7 | 0 | 10 | 1 | 10 |
| 251 | 0 | 10 | — | — | — | — |

EXAMPLE 3

Example 1 was repeated except that the sodium aluminate solution used contained from about 40.0 to 41.5 weight percent sodium aluminate as $NaAlO_2$ and the admixture with the ethyl acrylate/methacrylic acid copolymer latex was conducted at a temperature of about 200° F. The treated solution contained about 0.75 weight percent of the ethylacrylate/methacrylic acid copolymer based on sodium aluminate solids. Samples of treated and untreated solutions were stored as described above. The volume percentages of crystal formation in the sample at the examination intervals are set forth below in Table III. Each container was vented to the atmosphere.

TABLE III

| | Volume Percent Crystal | | | | | |
|---|---|---|---|---|---|---|
| | 75° F. Storage Temp. | | 120° F. Storage Temp. | | 130° F. Storage Temp. | |
| Storage Time (days) | Treated Sample | Untreated Sample | Treated Sample | Untreated Sample | Treated Sample | Untreated Sample |
| 32 | 0 | 0 | 0 | 0 | 0 | 0 |
| 35 | 0 | 0 | 0 | 5 | 0 | 5 |
| 40 | 0 | 1 | 0 | 5 | 0 | 5 |
| 55 | 0 | 3 | 0 | 7 | 0 | 7 |
| 87 | 0 | 5 | 2 | 10 | 2 | 10 |
| 110 | 0 | 7 | 2 | 10 | 2 | 10 |
| 144 | 0 | 10 | 2 | 10 | 2 | 10 |

EXAMPLE 4

The test described in Example 3 was repeated using like samples of the same treated and untreated sodium aluminate solutions except the storage containers were sealed instead of vented to the atmosphere and the storage time for the samples stored at 75° F. was extended to 251 days. The volume percentages of crystal formation in the samples at the examination intervals are set forth below in Table IV.

TABLE IV

| | Volume Percent Crystal | | | | | |
|---|---|---|---|---|---|---|
| | 75° F. Storage Temp. | | 120° F. Storage Temp. | | 130° F. Storage Temp. | |
| Storage Time (days) | Treated Sample | Untreated Sample | Treated Sample | Untreated Sample | Treated Sample | Untreated Sample |
| 32 | 0 | 0 | 0 | 0 | 0 | 0 |
| 35 | 0 | 0 | 0 | 0 | 0 | 0 |
| 40 | 0 | 0 | 0 | 1 | 0 | 3 |
| 55 | 0 | 1 | 0 | 5 | 0 | 5 |
| 87 | 0 | 2 | 1 | 8 | 1 | 8 |
| 110 | 0 | 5 | 2 | 8 | 2 | 8 |
| 144 | 0 | 8 | 2 | 8 | 2 | 8 |
| 251 | 0 | 8 | — | — | — | — |

In further preferred embodiment, the stabilized aqueous alkali metal aluminate composition contains from 20 to 50 weight percent of alkali metal aluminate and from 0.02 to 4 weight percent of an anionic vinyl polymer.

Industrial Applicability of the Invention

The method and composition of the present invention are applicable to all industries in which aqueous alkali metal aluminate compositions are utilized.

I claim:

1. A method of stabilizing an aqueous solution of alkali metal aluminate comprising:

admixing an aqueous solution of alkali metal aluminate having a pH of at least 10 with a sufficient amount of vinyl polymer having pendant carboxylate groups to form a solution containing from 0.1 to 2.0 weight percent of an anionic vinyl polymer based on alkali metal aluminate solids, wherein said anionic vinyl polymer has an average molecular weight of at least 500,000.

2. The method of claim 1 wherein said anionic vinyl polymer is comprised of at least 90 weight percent of units having the formula of

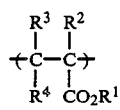

wherein $R^1$ is hydrogen, alkali metal cation, ammonia cation, or alkyl of 1 to 16 carbons atoms, and $R^2$, $R^3$, and $R^4$ are each independently hydrogen, alkyl of 1 to 16 carbon atoms, or a carboxylic acid moiety or water soluble salt thereof.

3. The method of claim 1 wherein said alkali metal aluminate is sodium aluminate.

4. The method of claim 1 wherein said vinyl polymer having pendant carboxylate groups is admixed as a water external latex prepared by emulsion polymerization.

5. The method of claim 2 wherein said anionic vinyl polymer is comprised of at least 95 percent of said units wherein $R^1$ is hydrogen, alkali metal cation, ammonia cation, or alkyl or 1 to 4 carbon atoms, and $R^2$, $R^3$, and $R^4$ are each independently hydrogen or alkyl, wherein $R^2$, $R^3$, and $R^4$ together comprise no more than 2 carbon atoms.

6. The method of claim 1 wherein said anionic vinyl polymer has an average molecular weight of at least 1,000,000.

7. The method of claim 5 wherein said anionic vinyl polymer is an ethylacrylate/methacrylic acid copolymer.

8. A stabilized alkali metal aluminate aqueous solution comprising in admixture:
an alkali metal aluminate;
an anionic vinyl polymer; and
water;
wherein said composition is an ungelled solution haivng a pH of at least 10; and
wherein said anionic vinyl polymer is present in the amount of from 0.1 to 2.0 weight percent based on alkali metal solids and has an average molecular weight of at least 500,000.

9. The aqueous solution of claim 8 wherein said anionic vinyl polymer is comprised of at least 90 weight percent of units having the formula of

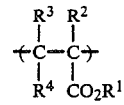

wherein $R^1$ is hydrogen, alkali metal cation, ammonia cation, or alkyl of 1 to 16 carbons atoms, and $R^2$, $R^3$, and $R^4$ are each independently hydrogen, alkyl of 1 to 16 carbon atoms, or a carboxylic acid moiety or water soluble salt thereof.

10. The aqueous solution of claim 8 wherein said alkali metal aluminate is sodium aluminate.

11. The aqueous solution of claim 9 wherein said anionic vinyl polymer is comprised of at least 95 weight percent of said units wherein $R^1$ is hydrogen, alkali metal cation, ammonia cation, or alkyl of 1 to 4 carbon atoms, and $R^2$, $R^3$, and $R^4$ are each independently hydrogen or alkyl, wherein $R^2$, $R^3$, and $R^4$ together comprise no more than 2 carbon atoms.

12. The aqueous solution of claim 9 wherein said anionic vinyl polymer has an average molecular weight of at least 1,000,000.

13. The aqueous solution of claim 11 wherein said anionic vinyl polymer is an ethylacrylate/methacrylic acid copolymer.

14. The aqueous solution of claim 9 wherein said composition contains from 20 to 50 weight percent of said alkali metal aluminate and from 0.02 to 4 weight percent of said anionic vinyl polymer.

* * * * *